United States Patent
Schweinbenz et al.

(10) Patent No.: US 9,899,713 B2
(45) Date of Patent: Feb. 20, 2018

(54) COMPONENT FOR OXYGEN ENRICHMENT, COMPONENT STACK, DEVICE FOR OBTAINING A FLUID ENRICHED WITH OXYGEN, METAL-OXYGEN BATTERY AND MOTOR VEHICLE

(71) Applicants: Robert Bosch GmbH, Stuttgart (DE); Samsung SDI Co., Ltd., Yongin-si, Gyeonggi-do (KR)

(72) Inventors: Jochen Schweinbenz, Stuttgart (DE); Markus Kohlberger, Stuttgart (DE)

(73) Assignees: Robert Bosch GmbH, Stuttgart (DE); Samsung SDI Co., Ltd., Yongin-si, Gyeonggi-do (KR)

(*) Notice: Subject to any disclaimer, the term of this patent is extended or adjusted under 35 U.S.C. 154(b) by 88 days.

(21) Appl. No.: 14/771,148

(22) PCT Filed: Jan. 20, 2014

(86) PCT No.: PCT/EP2014/050986
§ 371 (c)(1),
(2) Date: Aug. 27, 2015

(87) PCT Pub. No.: WO2014/135295
PCT Pub. Date: Sep. 12, 2014

(65) Prior Publication Data
US 2016/0006091 A1    Jan. 7, 2016

(30) Foreign Application Priority Data
Mar. 4, 2013 (DE) .................. 10 2013 203 591

(51) Int. Cl.
*H01M 12/08* (2006.01)
*B01D 63/08* (2006.01)
(Continued)

(52) U.S. Cl.
CPC .......... *H01M 12/08* (2013.01); *B01D 63/082* (2013.01); *C01B 13/0255* (2013.01);
(Continued)

(58) Field of Classification Search
CPC .. B01D 63/082; H01M 8/0662; H01M 12/08; H01M 4/8626; H01M 2220/20; C01B 13/0255; Y02E 60/128
See application file for complete search history.

(56) References Cited

U.S. PATENT DOCUMENTS

| 6,087,029 A | 7/2000 | Golovin et al. |
| 2009/0239132 A1 | 9/2009 | Johnson |
| 2012/0041628 A1 | 2/2012 | Hermann et al. |

FOREIGN PATENT DOCUMENTS

| CN | 1308781 A | 8/2001 |
| EP | 0 259 109 A2 | 3/1988 |

(Continued)

OTHER PUBLICATIONS

International Search Report corresponding to PCT Application No. PCT/EP2014/050986, dated Mar. 31, 2014 (German and English language document) (7 pages).

*Primary Examiner* — Muhammad S Siddiquee
(74) *Attorney, Agent, or Firm* — Maginot, Moore & Beck LLP

(57) ABSTRACT

A component for oxygen enrichment comprises at least one oxygen separation membrane formed flat with two edges running parallel to each other, the at least one oxygen separation membrane including channel side walls formed in a first side of the at least one oxygen separation membrane, running perpendicular to a surface of the at least one oxygen separation membrane and parallel to the edges of the at least one oxygen separation membrane to form at least one flow channel. A battery stack with two components for oxygen (Continued)

enrichment, and a battery connected to a battery stack is also disclosed.

3 Claims, 3 Drawing Sheets

(51) Int. Cl.
  *H01M 8/0662* (2016.01)
  *C01B 13/02* (2006.01)
  *H01M 4/86* (2006.01)
(52) U.S. Cl.
  CPC ....... *H01M 4/8626* (2013.01); *H01M 8/0662* (2013.01); *H01M 2220/20* (2013.01); *Y02E 60/128* (2013.01)

(56) References Cited

FOREIGN PATENT DOCUMENTS

| | | | | |
|---|---|---|---|---|
| JP | 2012-028017 A | 2/2012 | | |
| WO | 99/60654 A1 | 11/1999 | | |
| WO | WO9960654 | * 11/1999 | ............ | H01M 12/06 |
| WO | 02/076529 A1 | 10/2002 | | |
| WO | WO02076529 | * 10/2002 | ............ | B01D 71/26 |
| WO | 2011/052440 A1 | 5/2011 | | |

* cited by examiner

COMPONENT FOR OXYGEN ENRICHMENT, COMPONENT STACK, DEVICE FOR OBTAINING A FLUID ENRICHED WITH OXYGEN, METAL-OXYGEN BATTERY AND MOTOR VEHICLE

This application is a 35 U.S.C. § 371 National Stage Application of PCT/EP2014/050986, filed on Jan. 20, 2014, which claims the benefit of priority to Serial No. DE 10 2013 203 591.8, filed on Mar. 4, 2013 in Germany, the disclosures of which are incorporated herein by reference in their entirety.

The present disclosure concerns a component for oxygen enrichment, a component stack, a device for obtaining a fluid enriched with oxygen, a metal-oxygen battery and a motor vehicle. The metal-oxygen battery preferably comprises a lithium-oxygen battery cell.

BACKGROUND

Thanks to improved storage capacity, more frequent recharging capability and higher energy densities, metal-oxygen based batteries such as batteries based on lithium-oxygen cells are finding more and more applications. Batteries based on metal-oxygen cells are distinguished by high energy densities and an extremely low self-discharge, among other things.

Batteries with lower energy storage capacity are used, for example, for small portable electronic devices such as mobile telephones, laptops, camcorders and the like, while batteries with high capacity find use as an energy source to power the engines of motor vehicles, especially hybrid or electric vehicles etc., or as stationary energy storages, such as for systems extracting regenerative forms of energy.

If metal electrode and air electrode of a metal-oxygen cell are connected in electrically conducting manner to a consumer, the negatively charged metal ions flow from the metal electrode to the air electrode. At the same time, the metal ions flow through the electrically conductive electrolyte. This brings about a reaction with oxygen. When charging the metal-oxygen cell, this process occurs in the opposite direction, releasing once more the previously bound oxygen. Metal-oxygen cells enable relatively high energy densities, since the oxygen need not be contained in the battery itself, but instead can be supplied from the surroundings.

In a closed system, therefore, the quantity of oxygen in the system decreases during the discharging and increases again during the charging.

In an open system, ambient air can serve as the oxygen source, while in the case of lithium-oxygen cells in particular one must make sure that only oxygen, but not the humidity or other impurities are supplied to the cell. According to the prior art, as documented for example in WO 2011/052440 A1, lithium-oxygen cells therefore comprise a membrane, which is especially impervious to water and/or water vapor and preferably permeable to oxygen.

A lithium-oxygen cell is known from US 2009/0239132 A1, having an air inlet and an air outlet. The air inlet line here comprises an $H_2O$ and $CO_2$ separator.

US 2012/0041628 A1 deals with a metal-air battery, wherein an oxygen concentration is maintained constant during the charging of the battery. The oxygen supply comes from a tank, the oxygen being led in a circuit or given off to the ambient air.

SUMMARY

According to the disclosure, a component is provided for an oxygen enrichment. Furthermore, according to the disclosure, a component stack is provided, a device for supplying of an oxygen-enriched fluid is provided, a metal-oxygen battery is provided and a motor vehicle is provided.

The component proposed according to the disclosure comprises at least one oxygen separation membrane, which is formed flat with two edges running parallel to each other. The component is characterized in that channel side walls are formed in one side of the membrane, running perpendicular to the surface and parallel to the edges of the membrane in order to form at least one flow channel.

The component has the advantage of easily enabling oxygen enrichment or depletion of a fluid flowing through the flow channel.

In one embodiment, one side is a permeate side of the membrane.

Then fluid flowing through the flow channel can easily be depleted with the component.

In another embodiment, one side is a retentate side of the membrane.

Then fluid flowing through the flow channel can easily be enriched with the component.

The component stack proposed according to the disclosure comprises at least one component pair, which comprises a component of the one embodiment and a component of the other embodiment, while the membranes of the components have essentially the identical dimension and essentially the identical shape. The channel side walls of one of the components of the component pair are so connected to one side of the other component lying opposite the side that the channel side walls and the one side of the one component and the opposite side of the other component form a closed flow channel.

The component stack has the advantage of easily enabling oxygen enrichment or depletion of a fluid flowing through the closed flow channel.

In one embodiment of the component stack, the membranes of the components have essentially a quartic discrete rotationally symmetrical shape and the components of the pair are arranged such that the parallel running edges of one of the components are perpendicular to the parallel running edges of the other component.

This enables the easy supply and removal of oxygen and the fluid being enriched or depleted.

In another embodiment of the component stack, the components of the pair are arranged such that the parallel running edges of one of the components are parallel to the parallel running edges of the other component.

Then gas exchange can be advantageously realized in counterflow.

The device proposed according to the disclosure for producing an oxygen-enriched fluid comprises a fresh air supply, a spent air drain, an oxygen drain for supplying the oxygen-enriched fluid and a component stack according to the disclosure. The fresh air supply and the spent air drain here are fluidically connected to opposite ends of the flow channels of the component of the other embodiment. The oxygen drain is fluidically connected to the ends of the flow channels on one side of the component of the one embodiment.

In this way a pure or purified oxygen enrichment can easily be realized. In particular, oxygen-enriched fluid can be supplied to a metal-oxygen based battery by means of the device.

In one embodiment, the device can furthermore comprise a battery air supply, which is connected to opposite ends of the flow channels of the component of the one embodiment and is suitable to supplying oxygen-depleted fluid from the battery to the flow channels of the component of the one embodiment.

The oxygen supply for a metal-oxygen based battery is then even easier to arrange.

Advantageous modifications of the disclosure are indicated in the claims and described in the description.

BRIEF DESCRIPTION OF THE DRAWINGS

Sample embodiments of the disclosure are explained more closely with the aid of the drawings and the following description. In the figures.

DETAILED DESCRIPTION

Figure 1:
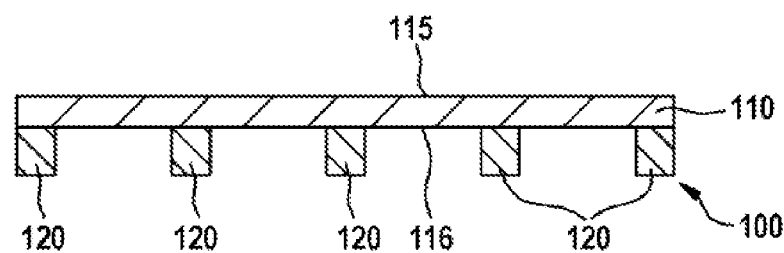
FIG. 1 depicts a first sample embodiment of a component for oxygen enrichment according to the disclosure.

FIG. 1 shows a first sample embodiment of the component 100 according to the disclosure in sectional view. The component 100 comprises a membrane 110 permeable to oxygen, but impervious to water in all states of aggregation, such as one made of perovskite. A permeate side 115 of the membrane 110, where oxygen builds up, is flat in configuration, while a retentate side 116 of the membrane 110, where oxygen is depleted, is provided with webs 120, which are perpendicular to the membrane 110. The webs 120 run parallel to the edges of the membrane. Neighboring webs 120 each time form an open flow channel. Therefore, the webs 120 are also called channel side walls. The webs 120 can consist of the same material as the membrane or comprise plastic and/or metal, for example.

Figure 2:
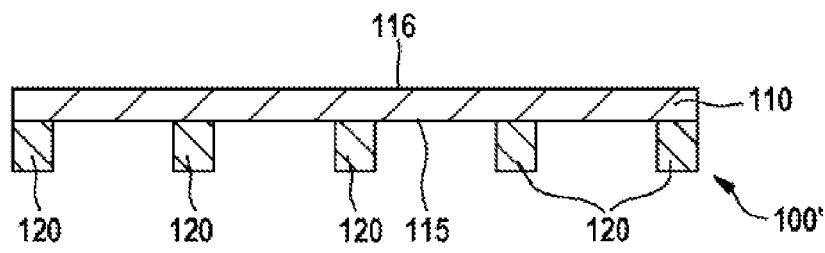
FIG. 2 depicts a second sample embodiment of a component for oxygen enrichment according to the disclosure.

The second sample embodiment of the component according to the disclosure which is shown in FIG. 2 differs merely in that the webs 120 in the second example are formed on the permeate side 115, while the retentate side 116 is flat in configuration.

In the examples of FIGS. 1 and 2, the components each time have five webs 120. The number of webs 120 can vary however, as long as at least one flow channel is realized by the webs 120. In one sample embodiment, the component has the shape of a trough or the shape of the letter π in cross section.

Figure 3:
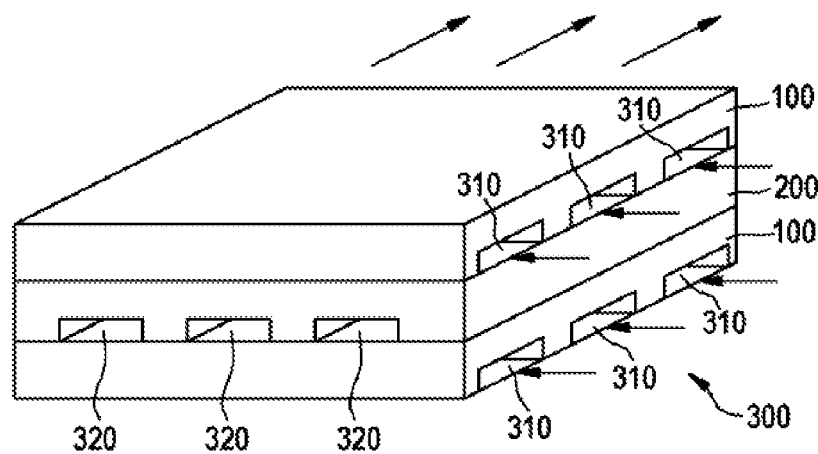
FIG. 3 depicts a sample embodiment of a component stack according to the disclosure.

FIG. 3 shows a sample embodiment of the component stack 300 according to the disclosure. The component stack 300 has alternatingly components 100 according to the first sample embodiment and components 200 according to the second sample embodiment, wherein the permeate side 115 of the component 100 and the retentate side 116 of the component 200 are fourfold discretely rotationally symmetrical and the components 100, 200 are glued, soldered, welded, or press-fitted to each other, so that closed flow channels are produced. In the component stack 300 the components 100 according to the first sample embodiment are rotated with respect to the components 200 of the second sample embodiment by 90 degrees in regard to the stack direction, with 360 degrees corresponding to the full circle. But the components 100, 200 also need not be rotated relative to each other, i.e., they can have the same orientation. In that case, no fourfold discrete rotational symmetry is needed. Only the webs 120 should run parallel with the edges of the membrane. For example, the edges can describe a curve, such as a 90 degree or a 180 degree curve, or an undulating line.

Thus, a plurality of closed flow channels 310, 320 is formed in the stack 300. Fluid such as a gas or a mixture of gases flowing through the flow channels 310 is then depleted in favor of fluid flowing through the flow channels 320. The flow channels 310 here can be connected by a pair of opposite sides of the component stack 300 and flow channels 320 can be connected by the other pair of opposite sides of the component stack 300. This is shown in FIG. 4 for the sample device 500.

Figure 4:
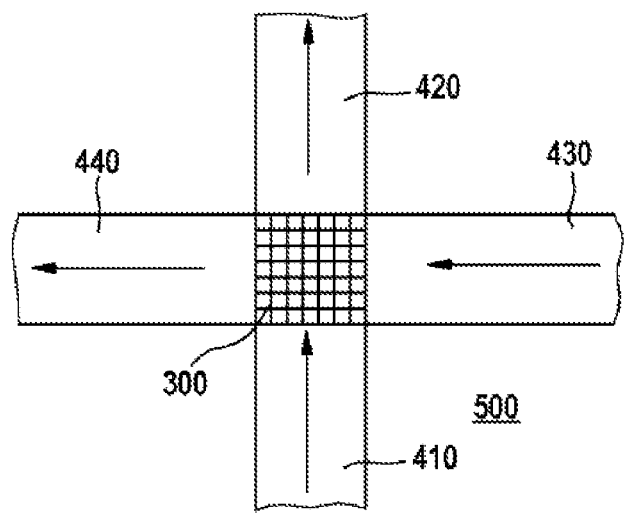
FIG. 4 depicts a sample embodiment of a device according to the disclosure for supplying an oxygen-enriched fluid.

Then the flow channels 310 can receive a flow of fresh air, as shown for example in FIG. 4, which is supplied to the flow channels 310 by a fresh air supply 410 connected in gas-tight manner to ends of the flow channels 310 and after becoming depleted it is taken away through a spent air drain 420 connected in gas-tight manner to the other ends of the flow channels 310. Perpendicular to the flow direction of the fresh air there flows fluid being enriched through another supply 430, which is connected in gas-tight manner to ends of the flow channels 320, and after becoming enriched with oxygen it is taken away through another drain 440, which is connected in gas-tight manner to the other ends of the flow channels 320. The oxygen-enriched fluid taken away can be supplied, for example, to a metal-oxygen battery of a motor vehicle, where the oxygen reacts in the course of the galvanic reaction and thereby becomes depleted once more. The resulting depleted fluid is taken back to the component stack 300 again through the additional supply 430.

Thus, a primary gas circuit can ensure that no impurities and/or water in any state of aggregation can penetrate into the metal-oxygen battery, while a secondary fresh air supply ensures that the battery constantly has fluid with adequate oxygen in a reactive state available, since the fluid moving in the primary circuit in the component stack is constantly enriched again.

Flow channels 310 here can receive sequential and/or parallel flow; in addition or alternatively, the flow channels 320 can receive sequential and/or parallel flow, while fluid emerging from the component stack 300 can be diverted back into the stack. It is also possible for the deflected fluid being depleted to flow out from a number of channels which is larger than the number of channels into which it is deflected back in. This increases the pressure in the retentate channels, so that the permeation is improved. Similarly, deflected fluid being enriched can flow out from a number of channels which is less than the number of channels into which it is deflected back in. This lowers the pressure in the permeate channels, so that the permeation is likewise improved.

Pressure rise and fall can also be accomplished in that the webs have increasing or decreasing width along the length of the component, so that the channel cross sections get smaller or larger along the length of the component.

Figure 5:
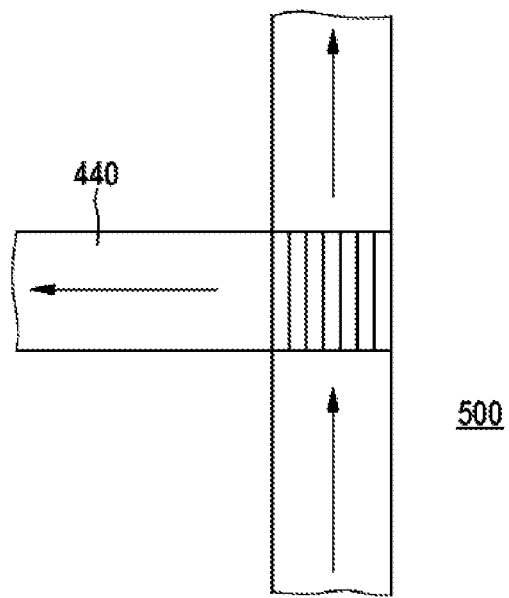
FIG. 5 depicts another sample embodiment of a device according to the disclosure for supplying an oxygen-enriched fluid.

Instead of taking the resulting depleted fluid back through the additional supply 430 into the component stack 300, the depleted fluid can also be taken to the surroundings. Then the device 500, as shown for example in FIG. 5, has no supply to the flow channels 320, but only an additional drain 440 to take away the oxygen permeating through the membrane 110.

Figure 6:
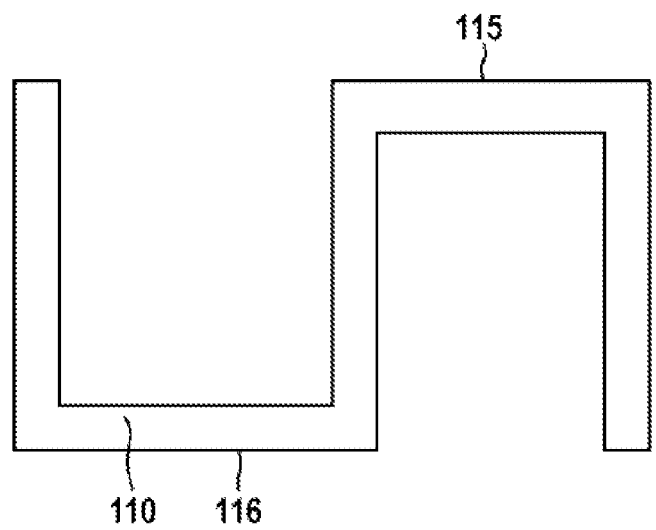
FIG. 6 depicts a third sample embodiment of a component for oxygen enrichment according to the disclosure.

In the sample embodiment shown in FIG. 6, the membrane has a square wave shape in cross section. Then the rectangular troughs of the wave form on one side of the membrane form open permeate channels and on the other side open retentate channels.

Figure 7:
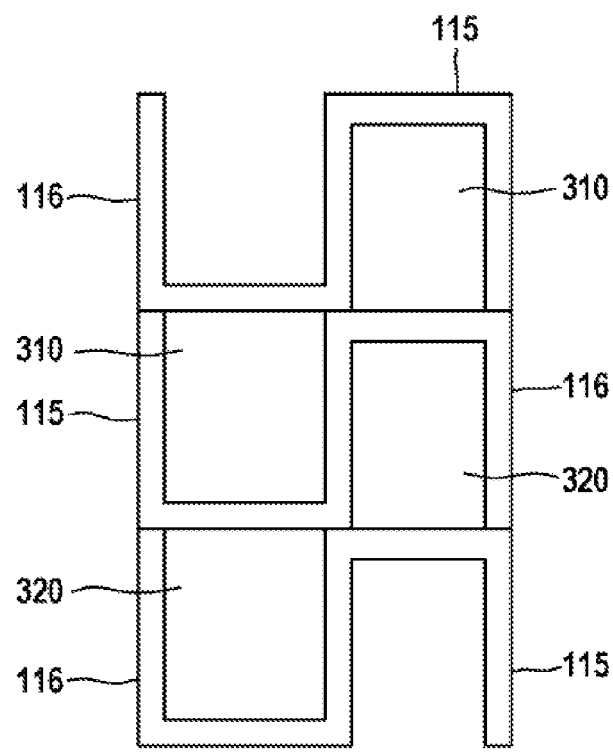
FIG. 7 depicts another sample embodiment of a component stack according to the disclosure.

A component pair of the component stack can also be formed by pairs of such square wave shaped membranes. This is shown as an example in FIG. 7. The retentate channel sides of the membranes of each pair face each other. This produces, looking in cross section, a checkerboard of closed permeate 320 and retentate channels 310. In one advantageous sample embodiment the permeate channels receive flow in a direction which is opposite the flow direction of the retentate channels.

The invention claimed is:

1. A device for producing an oxygen-enriched fluid, comprising:
   a component stack having at least one component pair including a first component and a second component, the first component and the second component each having at least one oxygen separation membrane formed flat with two edges running parallel to each other, the at least one oxygen separation membrane including channel side walls formed in a first side of the at least one oxygen separation membrane, running perpendicular to a surface of the at least one oxygen separation membrane and parallel to the edges of the at least one oxygen separation membrane to form at least one flow channel, the first side of the first component being a permeate side of the at least one oxygen separation membrane of the first component, the first side of the second component being a retentate side of the at least one oxygen separation membrane of the second component, the membrane of the first component and the second component each having essentially identical dimension and essentially identical shapes and the channel side walls of one of the first component and the second component are connected to an opposite side of the other of the first component and the second component such that the connected channel side walls and opposite sides of the components form at least one closed flow channel;
   a fresh air supply;
   a spent air drain, wherein the fresh air supply and the spent air drain are fluidically connected to opposite ends of the flow channels of the second component;
   an oxygen drain configured to supply the oxygen-enriched fluid, the oxygen drain fluidically connected to ends on one side of the flow channels of the first component;
   a battery air supply connected to opposite ends of the flow channels of the first component and configured to supply oxygen-depleted fluid from a battery to the flow channels of the first component;
   wherein the parallel running edges of the first component are parallel to the parallel running edges of the second component.

2. The device as claimed in claim 1, further comprising a metal-oxygen battery, wherein fluid enriched by the device is supplied to the metal-oxygen battery.

3. The device as claimed in claim 2, further comprising a motor vehicle with the metal-oxygen battery.

* * * * *